United States Patent
Yamano et al.

(10) Patent No.: US 11,677,083 B2
(45) Date of Patent: Jun. 13, 2023

(54) METHOD OF OPERATING FUEL CELL SYSTEM, AND FUEL CELL SYSTEM

(71) Applicant: HONDA MOTOR CO., LTD., Tokyo (JP)

(72) Inventors: Naoki Yamano, Saitama (JP); Takashi Arai, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/668,387

(22) Filed: Feb. 10, 2022

(65) Prior Publication Data

US 2022/0311025 A1  Sep. 29, 2022

(30) Foreign Application Priority Data

Mar. 29, 2021 (JP) .............. JP2021-055023

(51) Int. Cl.
| | |
|---|---|
| *H01M 8/04014* | (2016.01) |
| *H01M 8/24* | (2016.01) |
| *H01M 8/04007* | (2016.01) |
| *H01M 8/04302* | (2016.01) |

(Continued)

(52) U.S. Cl.
CPC .......... *H01M 8/04022* (2013.01); *H01M 8/04067* (2013.01); *H01M 8/04089* (2013.01); *H01M 8/04201* (2013.01); *H01M 8/04302* (2016.02); *H01M 8/24* (2013.01)

(58) Field of Classification Search
CPC ...... H01M 8/04022; H01M 8/04067; H01M 8/24; H01M 8/04089; H01M 8/04302; H01M 8/04365; H01M 8/04447; H01M 8/04201; H01M 8/2457
See application file for complete search history.

(56) References Cited

U.S. PATENT DOCUMENTS

| | | | |
|---|---|---|---|
| 2009/0075135 A1 | 3/2009 | Nonobe | |
| 2015/0352974 A1* | 12/2015 | Kawase | H01M 8/04373 701/22 |
| 2016/0380284 A1 | 12/2016 | Okuyoshi et al. | |

(Continued)

FOREIGN PATENT DOCUMENTS

| | | | |
|---|---|---|---|
| JP | 2003056799 A | 2/2003 | |
| JP | 2003187836 A | 7/2003 | |

(Continued)

OTHER PUBLICATIONS

Notification of Reasons for Refusal issued in the JP Patent Application No. 2021-055023, dated Feb. 7, 2023.

*Primary Examiner* — Stewart A Fraser
(74) *Attorney, Agent, or Firm* — CKC & Partners Co., LLC

(57) ABSTRACT

Provided is a method of operating a fuel cell system equipped with a fuel cell stack, a liquid hydrogen storage unit configured to store liquid hydrogen, a boil-off gas recovery unit configured to recover boil-off gas generated from the liquid hydrogen storage unit, and a hydrogen concentration estimation unit configured to estimate the hydrogen concentration at a hydrogen electrode in the fuel cell stack in a standby state, the method including: in a case in which a hydrogen concentration at a hydrogen electrode in the fuel cell stack in a standby state has become less than a predetermined value, supplying boil-off gas recovered by the boil-off gas recovery unit to the hydrogen electrode in the fuel cell stack.

3 Claims, 3 Drawing Sheets

(51) Int. Cl.
*H01M 8/04089* (2016.01)
*H01M 8/04082* (2016.01)

(56) References Cited

U.S. PATENT DOCUMENTS

2018/0358640 A1* 12/2018 Shiomi ............. H01M 8/04231
2020/0266460 A1*  8/2020 Noda ................ H01M 8/04201
2020/0388862 A1* 12/2020 Miyazaki .......... H01M 8/04365

FOREIGN PATENT DOCUMENTS

| | | |
|---|---|---|
| JP | 2004164951 A | 6/2004 |
| JP | 2007059321 A | 3/2007 |
| JP | 2017010866 A | 1/2017 |
| WO | 2006126629 A1 | 11/2006 |

* cited by examiner

METHOD OF OPERATING FUEL CELL SYSTEM, AND FUEL CELL SYSTEM

This application is based on and claims the benefit of priority from Japanese Patent Application No. 2021-055023, filed on 29 Mar. 2021, the content of which is incorporated herein by reference.

BACKGROUND OF THE INVENTION

Field of the Invention

The present invention pertains to a method of operating a fuel cell system, and a fuel cell system.

Related Art

Conventionally, a fuel cell stack has been employed in a generator, an electric automobile, etc.

A fuel cell which makes up a fuel cell stack typically sandwiches a solid polymer electrolyte membrane between a hydrogen electrode (anode) and an oxygen electrode (cathode), and generates electricity by supplying hydrogen gas to the hydrogen electrode and supplying air to the oxygen electrode.

At this time, after liquid hydrogen stored in a tank is vaporized, hydrogen gas is supplied to the hydrogen electrode, but boil-off gas occurs due to heat penetrating the tank from outside and liquid hydrogen vaporizing. As a result, pressure inside the tank rises and thus it is necessary to discharge the boil-off gas in the tank.

Accordingly, a method for storing boil-off gas discharged from a tank after increasing the pressure of the boil-off gas, and subsequently supplying the boil-off gas to a hydrogen electrode to thereby generate electricity is known (for example, refer to Patent Document 1).

Patent Document 1: Japanese Unexamined Patent Application, Publication No. 2003-56799

SUMMARY OF THE INVENTION

Air from outside penetrates a hydrogen electrode while the fuel cell stack is on standby, but there is a problem that the fuel cell stack will deteriorate when the fuel cell stack is activated in this state.

An object of the present invention is to provide a method of operating a fuel cell system, the method enabling suppression of deterioration of a fuel cell stack, and to provide a fuel cell system.

One aspect of the present invention is a method of operating a fuel cell system including: a fuel cell stack, a liquid hydrogen storage unit configured to store liquid hydrogen; a boil-off gas recovery unit configured to recover boil-off gas generated from the liquid hydrogen storage unit; and a hydrogen concentration estimation unit configured to estimate the hydrogen concentration at a hydrogen electrode in the fuel cell stack in a standby state, the method including: in a case in which a hydrogen concentration at a hydrogen electrode in the fuel cell stack in a standby state has become less than a predetermined value, supplying boil-off gas recovered by the boil-off gas recovery unit to the hydrogen electrode in the fuel cell stack.

The method of operating a fuel cell system may include, in a case in which a hydrogen concentration at a hydrogen electrode in the fuel cell stack in a standby state has become less than a predetermined value, activating the fuel cell stack by supplying boil-off gas recovered by the boil-off gas recovery unit to the hydrogen electrode in the fuel cell stack.

The fuel cell system may include a plurality of the fuel cell stacks and the hydrogen concentration estimation unit, and in a case in which there are two or more of the fuel cell stacks for which a hydrogen concentration at the hydrogen electrode is less than the predetermined value, the fuel cell stack in which the hydrogen electrode is to be supplied with boil-off gas recovered by the boil-off gas recovery unit may be sequentially switched.

The fuel cell system may further include a heating unit configured to heat an environment around the fuel cell stack by causing the boil-off gas to combust, and a temperature detection unit configured to detect a temperature of the environment around the fuel cell stack while the fuel cell stack is on standby, and in a case in which the temperature of the environment around the fuel cell stack has become less than a predetermined value while the fuel cell stack is on standby, the boil-off gas recovered by the boil-off gas recovery unit may be supplied to the heating unit.

Another aspect of the present invention is a fuel cell system, including: a fuel cell stack; a liquid hydrogen storage unit configured to store liquid hydrogen; a boil-off gas recovery unit configured to recover boil-off gas generated from the liquid hydrogen storage unit; a hydrogen concentration estimation unit configured to estimate a hydrogen concentration at a hydrogen electrode in the fuel cell stack in a standby state; a pressure-increasing unit configured to subject, to pressure-increasing, hydrogen gas which is discharged from the liquid hydrogen storage unit and vaporized, and subject the boil-off gas recovered by the boil-off gas recovery unit to pressure-increasing; a hydrogen gas storage unit capable of storing the pressure-increased hydrogen gas and supplying the stored hydrogen gas to the hydrogen electrode in the fuel cell stack; a first flow path that connects the liquid hydrogen storage unit with the pressure-increasing unit via the boil-off gas recovery unit; a second flow path that connects the liquid hydrogen storage unit with the pressure-increasing unit by bypassing the boil-off gas recovery unit; a third flow path that connects the pressure-increasing unit with the hydrogen electrode in the fuel cell stack via the hydrogen gas storage unit; a fourth flow path that connects the pressure-increasing unit with the hydrogen electrode in the fuel cell stack by bypassing the hydrogen gas storage unit; a first valve body provided in the first flow path between the boil-off gas recovery unit and the pressure-increasing unit; a second valve body provided in the second flow path between the liquid hydrogen storage unit and the pressure-increasing unit; a third valve body provided in the third flow path between the pressure-increasing unit and the hydrogen gas storage unit; and a fourth valve body provided in the fourth flow path between the pressure-increasing unit and the hydrogen electrode in the fuel cell stack.

The fuel cell system may include a boil-off gas storage unit configured to store the pressure-increased boil-off gas and a valve body, which are provided in order downstream of the third valve body in the third flow path.

The hydrogen gas storage unit may be a cylinder bundle.

The fuel cell system may further include a plurality of the fuel cell stacks; the hydrogen concentration estimation unit; a first branched flow path that connects the third flow path with the plurality of the fuel cell stacks; a second branched flow path that connects the fourth flow path with the plurality of the fuel cell stacks; and a plurality of valve bodies each provided in a branched portion of the first branched flow path and a branched portion of the second branched flow path.

The fuel cell system may further include: a heating unit configured to heat an environment around the fuel cell stack by causing the boil-off gas to combust; and a temperature detection unit configured to detect a temperature of the environment around the fuel cell stack while the fuel cell stack is on standby, in which the first flow path may connect the liquid hydrogen storage unit with the pressure-increasing unit and the heating unit via the boil-off gas recovery unit, and a valve body may be further provided in the first flow path between the boil-off gas recovery unit and the heating unit.

By virtue of the present invention, it is possible to provide a method of operating a fuel cell system, the method enabling suppression of deterioration of a fuel cell stack, and to provide a fuel cell system.

DETAILED DESCRIPTION OF THE INVENTION

Description is given below regarding embodiments of the present invention with reference to the drawings.

Figure 1:
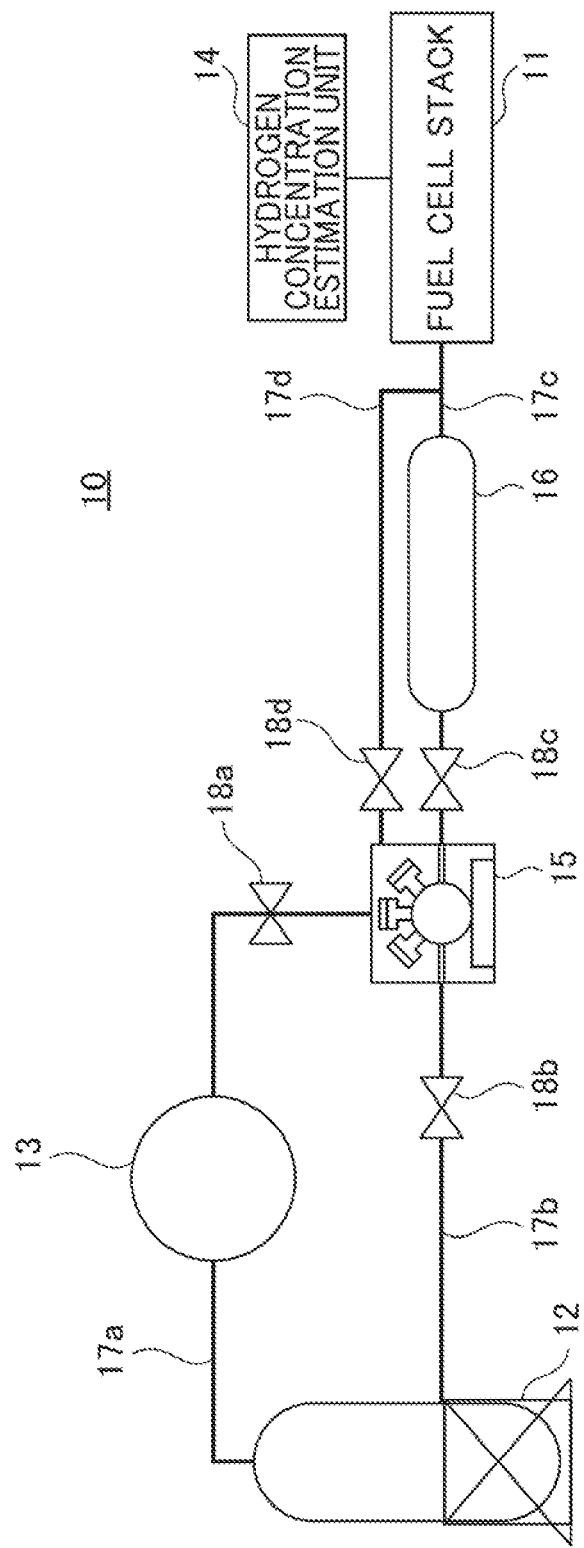
FIG. 1 is a view illustrating an example of a fuel cell system according to the present embodiment.

FIG. 1 illustrates an example of a fuel cell system according to the present embodiment.

A fuel cell system 10 is provided with a fuel cell stack 11, a liquid hydrogen tank 12, a boil-off gas tank 13, a hydrogen concentration estimation unit 14, a compressor 15, a pressure accumulating tank 16 (for example, a cylinder bundle), and a control unit (for example, a computer). The liquid hydrogen tank 12 functions as a liquid hydrogen storage unit for storing liquid hydrogen, and the boil-off gas tank 13 functions as a boil-off gas recovery unit for recovering boil-off gas generated from the liquid hydrogen tank 12. The hydrogen concentration estimation unit 14 estimates the hydrogen concentration at hydrogen electrodes in the fuel cell stack 11 in a standby state. Furthermore, the compressor 15 functions as a pressure-increasing unit for increasing the pressure of hydrogen gas which vaporizes after being emitted from the liquid hydrogen tank 12, and boil-off gas recovered by the boil-off gas tank 13. The pressure accumulating tank 16 functions as a hydrogen gas storage unit capable of storing pressure-increased hydrogen gas and supplying stored hydrogen gas to hydrogen electrodes in the fuel cell stack 11.

The fuel cell system 10 is provided with a pipe 17a, a pipe 17b, a pipe 17c, and a pipe 17d. The pipe 17a functions as a first flow path for connecting the liquid hydrogen tank 12 with the compressor 15 via the boil-off gas tank 13, and the pipe 17b functions as a second flow path for connecting the liquid hydrogen tank 12 with the compressor 15 by bypassing the boil-off gas tank 13. The pipe 17c functions as a third flow path for connecting the compressor 15 with the hydrogen electrodes in the fuel cell stack 11 via the pressure accumulating tank 16, and the pipe 17d functions as a fourth flow path for connecting the compressor 15 with the hydrogen electrodes in the fuel cell stack 11 by bypassing the pressure accumulating tank 16. The pipes 17c and 17d form a branched pipe, and although a downstream side of the branched pipe is shared, the pressure accumulating tank 16 is provided in the pipe 17c in a region where the branched pipe is branched.

Note that it may be that the pipes 17c and 17d are each an independent pipe and do not form a branched pipe.

The fuel cell system 10 is provided with a valve 18a, a valve 18b, a valve 18c, and a valve 18d. The valve 18a functions as a first valve body provided in the pipe 17a between the boil-off gas tank 13 and the compressor 15, and the valve 18b functions as a second valve body provided in the pipe 17b between the liquid hydrogen tank 12 and the compressor 15. The valve 18c functions as a third valve body provided in the pipe 17c between the compressor 15 and the pressure accumulating tank 16, and the valve 18d functions as a fourth valve body provided in the pipe 17d between the compressor 15 and the hydrogen electrodes in the fuel cell stack 11, in the region where the branched pipe is branched.

At this point, when the valves 18a and 18d are set to an open state and the valves 18b and 18c are set to a closed state, boil-off gas recovered by the boil-off gas tank 13 is increased in pressure by the compressor 15, and subsequently supplied to the hydrogen electrodes in the fuel cell stack 11. In addition, when the valves 18a and 18d are set to a closed state and the valves 18b and 18c are set to an open state, hydrogen gas which vaporizes after being emitted from the liquid hydrogen tank 12 is increased in pressure by the compressor 15 and subsequently supplied to the pressure accumulating tank 16.

Note that second boil-off gas tank and a valve may be provided in this order downstream of the valve 18d in pipe 17d in the region where the branched pipe is branched. Here, the second boil-off gas tank would function as a boil-off gas storage unit for storing pressure-increased boil-off gas. In this case, the control unit can control supply of pressure-increased boil-off gas to the hydrogen electrodes in the fuel cell stack 11 by opening or closing the valve provided downstream of the second boil-off gas tank.

At a time when the fuel cell system 10 is on standby, when the hydrogen concentration at hydrogen electrodes in the fuel cell stack 11 in a standby state becomes less than a predetermined value, the pressure-increased boil-off gas is supplied to the hydrogen electrodes in the fuel cell stack 11. As a result, because it is possible to replace air from outside which has penetrated a hydrogen electrode while the fuel cell stack 11 is on standby with boil-off gas, deterioration of the fuel cell stack 11 is suppressed even if the fuel cell stack 11 is activated. In addition, by maintaining, at a high level, the hydrogen concentration at hydrogen electrodes in the fuel cell stack 11 in a standby state, it is possible to shorten the amount of time for supplying boil-off gas to the hydrogen electrodes when activating the fuel cell stack 11. It is also possible to effectively use the boil-off gas. At this time, the fuel cell stack 11 for which the pressure-increased boil-off gas has been supplied to the hydrogen electrodes may be activated.

The hydrogen concentration estimation unit 14, for example, can estimate the hydrogen concentration at hydrogen electrodes in the fuel cell stack 11 in a standby state based on standby time for the fuel cell stack 11 obtained by a real-time clock. In this case, the control unit performs control so that pressure-increased boil-off gas is supplied to hydrogen electrodes in the fuel cell stack 11 when the standby time for the fuel cell stack 11 exceeds a predetermined value.

Note that it may be that a hydrogen sensor is provided at hydrogen electrodes in the fuel cell stack 11, and the hydrogen concentration estimation unit 14 estimates the hydrogen concentration at a hydrogen electrode in the fuel cell stack 11 in a standby state based on data obtained by the hydrogen sensor.

Figure 2:
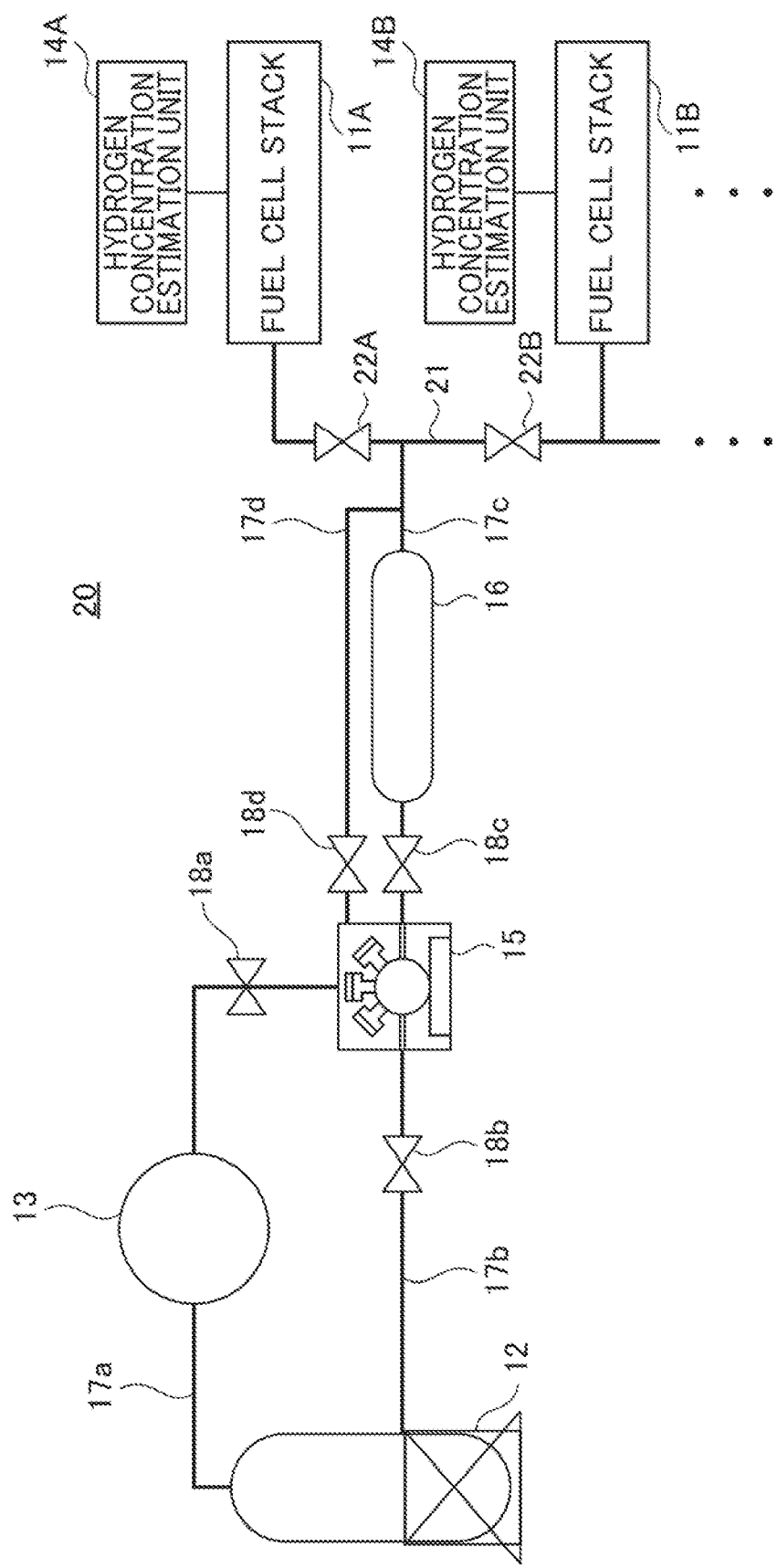
FIG. 2 is a view illustrating a variation of the fuel cell system in FIG. 1.

FIG. 2 illustrates a variation of the fuel cell system 10.

A fuel cell system 20, apart from being provided with a plurality of fuel cell stacks 11A, 11B, . . . and hydrogen concentration estimation units 14A, 14B, . . . , a branched pipe 21, and a plurality of valves 22A, 22B, . . . , has the same configuration as the fuel cell system 10. Here, the branched pipe 21 serves as both of a first branched flow path for connecting the pipe 17c with hydrogen electrodes in the fuel cell stacks 11A, 11B, . . . , and a second branched flow path for connected the pipe 17d with hydrogen electrodes in the fuel cell stacks 11A, 11B, . . . . In addition, the valves 22A, 22B, . . . are provided in the branched portion of the branched pipe 21 in order to, by being opened or closed, make it possible to supply pressure-increased boil-off gas and hydrogen gas to one or more hydrogen electrodes in the fuel cell stacks 11A, 11B, . . . . For example, in a case of supplying pressure-increased boil-off gas and hydrogen gas to the hydrogen electrodes in the fuel cell stack 11A, only the valve 22A is set to the open state and the other valves 22B, . . . are set to the closed state.

Note that the fuel cell system 20 has one supply unit (the configuration of the fuel cell system 10 apart from the fuel cell stack 11 and the hydrogen concentration estimation unit 14) for supplying pressure-increased hydrogen gas and boil-off gas to the hydrogen electrodes in a fuel cell stack, but may have a plurality of supply units.

When operating the fuel cell system 20, when the hydrogen concentration at a hydrogen electrode in any of the fuel cell stacks 11A, 11B, . . . in a standby state becomes less than a predetermined value, pressure-increased boil-off gas is supplied to the hydrogen electrode in the fuel cell stack for which the hydrogen concentration at the hydrogen electrode is less than the predetermined value.

In the case in which there are two or more fuel cell stacks for which the hydrogen concentration at the hydrogen electrode is less than the predetermined value, the fuel cell stack in which the hydrogen electrodes are to be supplied with pressure-increased boil-off gas is sequentially switched. In this case, the control unit may perform control so that supply of pressure-increased boil-off gas to hydrogen electrodes is performed in order from the fuel cell stack having the hydrogen electrodes with the lowest hydrogen concentration. At this time, a fuel cell stack for which the pressure-increased boil-off gas has been supplied to the hydrogen electrodes may be activated.

Note that switching may be sequentially performed among fuel cell stack groups each comprising two or more fuel cell stacks in which the hydrogen electrodes are to be supplied with pressure-increased boil-off gas. In other words, an operation for supplying pressure-increased boil-off gas to hydrogen electrodes in a fuel cell stack group may be repeated. At this point, activation may be caused in order from the fuel cell stack group having the lowest degree of deterioration.

When the fuel cell system 20 is used, it is possible to cause one or more fuel cell stacks to go on standby in turn, and thus deterioration of the fuel cell stacks is suppressed.

Figure 3:
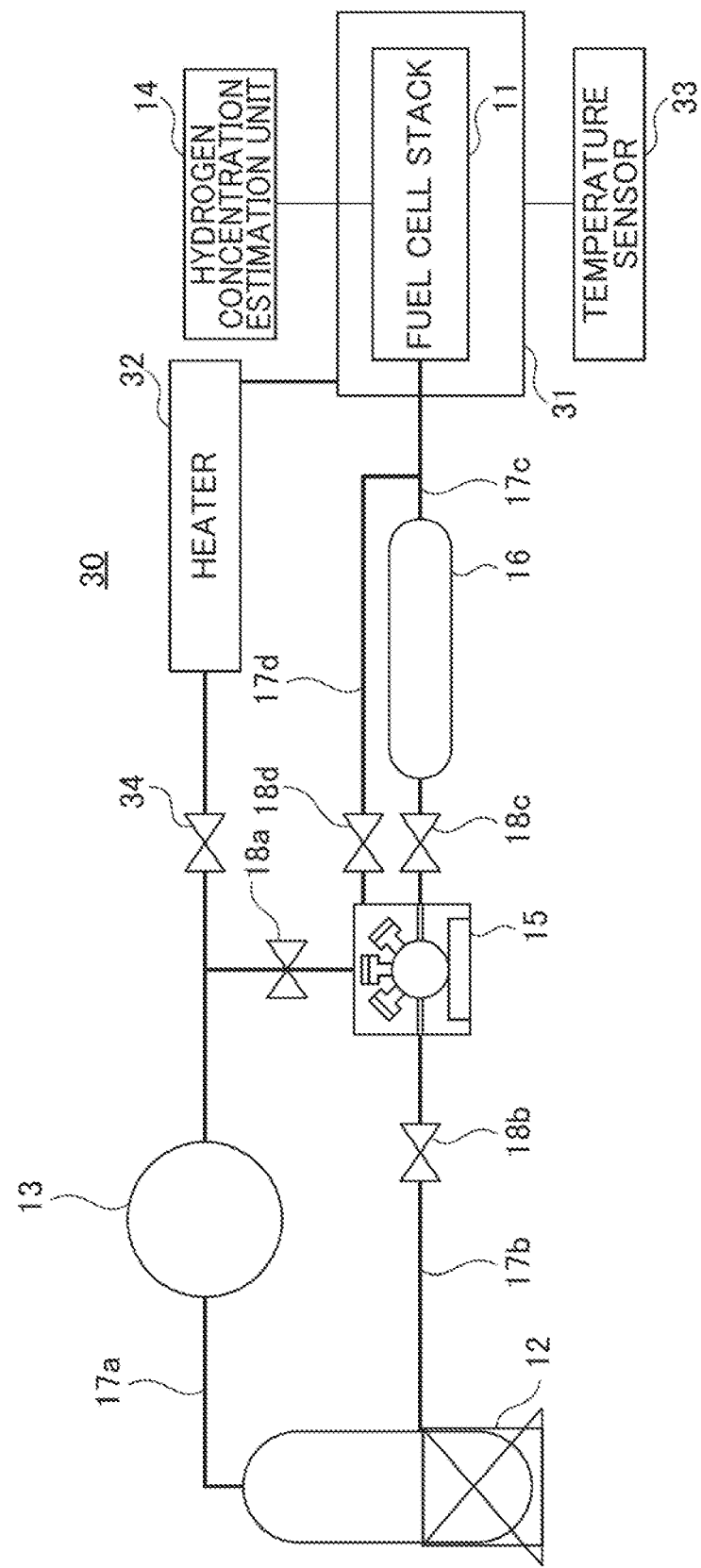
FIG. 3 is a view illustrating another example of a fuel cell system according to the present embodiment.

FIG. 3 illustrates another example of a fuel cell system according to the present embodiment.

A fuel cell system 30, apart from being additionally provided with a heater 32 and a temperature sensor 33, has approximately the same configuration as the fuel cell system 10. The heater 32 functions as a heating unit for heating an environment 31 around the fuel cell stack 11 by causing boil-off gas to combust, and the temperature sensor 33 functions as a temperature detection unit for detecting the temperature of the environment around the fuel cell stack 11 while the fuel cell stack 11 is on standby. In addition, the pipe 17a connects the liquid hydrogen tank 12 with the compressor 15 and the heater 32 via the boil-off gas tank 13. The fuel cell system 30 is also provided with a valve 34 between the boil-off gas tank 13 and the heater 32 in the pipe 17a.

At this point, when the valve 34 is set to a closed state and, similarly to in the fuel cell system 10, the valves 18a and 18d are set to an open state and the valves 18b and 18c are set to a closed state, boil-off gas recovered by the boil-off gas tank 13 is increased in pressure by the compressor 15, and subsequently supplied to the hydrogen electrodes in the fuel cell stack 11. In addition, when the valves 18a and 18d are set to a closed state and the valves 18b and 18c are set to an open state, hydrogen gas which vaporizes after being emitted from the liquid hydrogen tank 12 is increased in pressure by the compressor 15 and subsequently supplied to the pressure accumulating tank 16. Furthermore, when the valve 34 is set to the open state and the valves 18a, 18b, 18c, and 18d are set to the closed state, boil-off gas stored in the boil-off gas tank 13 is supplied to the heater 32. At this point, the boil-off gas stored in the boil-off gas tank 13 may be increased in pressure and subsequently supplied to the heater 32.

In a case of operating the fuel cell system 30, similarly to the fuel cell system 10, when the hydrogen concentration at a hydrogen electrode in the fuel cell stack 11 in a standby state becomes less than a predetermined value, the pressure-increased boil-off gas is supplied to the hydrogen electrodes in the fuel cell stack 11.

In addition, when the temperature of the environment 31 around the fuel cell stack 11 during standby has become less than a predetermined value (for example, 0° C.), the boil-off gas recovered by the boil-off gas tank 13 is supplied to the heater 32. As a result, the environment 31 is heated by combusting the boil-off gas, the temperature of the environment 31 rises, and the amount of time required to activate the fuel cell stack 11 shortens. As a result, it becomes easier to employ the fuel cell stack 11 in an emergency generator. It is also possible to effectively use the boil-off gas.

In this case, when the temperature of the environment 31 around the fuel cell stack 11 during standby has become less than the predetermined value, the control unit performs control to supply the boil-off gas recovered by the boil-off gas tank 13 to the heater 32.

Note that, similarly to the fuel cell system 20, a configuration in which the fuel cell system 30 is provided with the plurality of fuel cell stacks 11A, 11B, . . . and hydrogen concentration estimation units 14A, 14B, . . . , the branched pipe 21, and the plurality of valves 22A, 22B, . . . may be employed.

In this case, the heater 32 may be used to heat the environments around the plurality of fuel cell stacks 11A, 11B, . . . , or the heater 32 may be used to individually heat the environment around each of the plurality of fuel cell stacks 11A, 11B, . . . . In addition, it may be that control is performed to supply some boil-off gas to the heater 32, and control is performed to supply the remainder of the boil-off gas to the hydrogen electrodes in the fuel cell stacks 11 in order to maintain a high hydrogen concentration at the hydrogen electrodes.

EXPLANATION OF REFERENCE NUMERALS 10, 20, 30 Fuel cell system
11, 11A, 11B, Fuel cell stack 12 Liquid hydrogen tank
13 Boil-off gas tank
14, 14A, 14B Hydrogen concentration estimation unit
15 Compressor
16 Pressure accumulating tank
17a, 17b, 17c, 17d Pipe
18a, 18b, 18c, 18d Valve
21 Branched pipe
22A, 22B Valve
31 Environment
32 Heater
33 Temperature sensor
34 Valve

What is claimed is:

1. A method of operating a fuel cell system comprising:
a fuel cell stack;
a liquid hydrogen storage unit configured to store liquid hydrogen;
a boil-off gas recovery unit configured to recover boil-off gas generated from the liquid hydrogen storage unit;
a hydrogen concentration estimation unit configured to estimate a hydrogen concentration at a hydrogen electrode in the fuel cell stack in a standby state;
a heating unit configured to heat an environment around the fuel cell stack by causing the boil-off gas to combust; and
a temperature detection unit configured to detect a temperature of the environment around the fuel cell stack while the fuel cell stack is on standby,
the method comprising:
in a case in which a hydrogen concentration at the hydrogen electrode in the fuel cell stack in a standby state has become less than a predetermined value, supplying the boil-off gas recovered by the boil-off gas recovery unit to the hydrogen electrode in the fuel cell stack, and
in a case in which the temperature of the environment around the fuel cell stack has become less than a predetermined value while the fuel cell stack is on standby, supplying to the heating unit, the boil-off as recovered by the boil-off as recovery unit.

2. The method according to claim 1, further comprising, in a case in which the hydrogen concentration at the hydrogen electrode in the fuel cell stack in a standby state has become less than the predetermined value, activating the fuel cell stack after supplying boil-off gas recovered by the boil-off gas recovery unit to the hydrogen electrode in the fuel cell stack.

3. The method according to claim 1, wherein
the fuel cell system comprises a plurality of the fuel cell stacks and the hydrogen concentration estimation unit, the method further comprising:
in a case in which there are two or more of the fuel cell stacks for which a hydrogen concentration at the hydrogen electrode is less than the predetermined value, sequentially switching the fuel cell stack in which the hydrogen electrode is to be supplied with boil-off gas recovered by the boil-off gas recovery unit.

* * * * *